US012808406B2

(12) United States Patent
Ayalon et al.

(10) Patent No.: US 12,808,406 B2
(45) Date of Patent: Nov. 24, 2026

(54) KINEMATIC MOUNT HAVING THREE POINTS OF CONTACT

(71) Applicant: ELBIT SYSTEMS ELECTRO-OPTICS ELOP LTD., Rehovot (IL)

(72) Inventors: Ehud Ayalon, Rehovot (IL); Daniel Wormser, Rehovot (IL); Yonit Miron Salomon, Rehovot (IL)

(73) Assignee: ELBIT SYSTEMS ELECTRO-OPTICS ELOP LTD., Rehovot (IL)

( * ) Notice: Subject to any disclaimer, the term of this patent is extended or adjusted under 35 U.S.C. 154(b) by 177 days.

(21) Appl. No.: 18/957,930

(22) Filed: Nov. 25, 2024

(65) Prior Publication Data

US 2025/0084898 A1 Mar. 13, 2025

Related U.S. Application Data

(63) Continuation of application No. PCT/IL2023/050528, filed on May 23, 2023.

(30) Foreign Application Priority Data

May 23, 2022 (IL) ........................................ 293278

(51) Int. Cl.
*F16C 31/04* (2006.01)

(52) U.S. Cl.
CPC .......... *F16C 31/04* (2013.01); *F16C 2202/04* (2013.01); *F16C 2226/00* (2013.01); *F16C 2300/02* (2013.01)

(58) Field of Classification Search
CPC ............... B64G 1/2224; F16C 2300/02; F16C 2226/00; F16C 2202/04; F16C 31/04
See application file for complete search history.

(56) References Cited

U.S. PATENT DOCUMENTS 3,588,232 A * 6/1971 Mostel ................ G02B 7/1825 74/89.45
4,268,123 A * 5/1981 Mesco .................. G02B 7/182 359/848

(Continued)

FOREIGN PATENT DOCUMENTS

DE 102011109713 A1 * 2/2013 ........... B60G 15/068
EP 1179746 2/2002

(Continued)

*Primary Examiner* — Joshua J Michener
*Assistant Examiner* — Aaron M Rodziwicz
(74) *Attorney, Agent, or Firm* — PEARL COHEN LLP

(57) ABSTRACT

A mount surrounding a rigid body within an enclosure, is provided herein. The mount includes: a first pair of a first pin and first spherical bearing, wherein the first pin is movable within the first spherical bearing while being in contact with the rigid body such that two degrees of freedom (DOF) restriction enable a displacement of the rigid body; a second pair of a second pin and second spherical bearing, wherein the second pin is movable within the second spherical bearing while being in contact with the rigid body such that two DOF restriction enable a displacement of the rigid body; and a third pair of a third pin and third spherical bearing, wherein the third pin is movable within the third spherical bearing while being in contact with the rigid body such that two DOF restriction enable a displacement of the rigid body.

20 Claims, 7 Drawing Sheets

(56) References Cited

U.S. PATENT DOCUMENTS

| | | | | | |
|---|---|---|---|---|---|
| 4,618,111 | A | * | 10/1986 | Sherwood ................ | B64G 1/66<br>248/176.1 |
| 4,681,408 | A | | 7/1987 | Ahmed et al. | |
| 4,726,671 | A | * | 2/1988 | Ahmad ................ | G02B 7/1825<br>359/848 |
| 4,770,497 | A | | 9/1988 | Brown | |
| 5,305,981 | A | | 4/1994 | Cunningham et al. | |
| 11,313,508 | B2 | * | 4/2022 | Gallagher .............. | F16M 11/10 |
| 2006/0054767 | A1 | | 3/2006 | Kemeny | |
| 2007/0284502 | A1 | * | 12/2007 | Hsin ...................... | G02B 7/005<br>248/495 |
| 2012/0119973 | A1 | * | 5/2012 | Ahring ...................... | F41H 5/26<br>343/882 |
| 2016/0069506 | A1 | | 3/2016 | Shelef et al. | |

FOREIGN PATENT DOCUMENTS

| | | | | | |
|---|---|---|---|---|---|
| EP | 1376183 | | | 1/2004 | |
| EP | 1668419 | | | 6/2006 | |
| JP | 2002131605 | A | * | 5/2002 | ......... G03F 7/70825 |
| JP | 2010520501 | A | * | 6/2010 | ............. G02B 7/023 |
| JP | 2010521708 | A | * | 6/2010 | ............. G02B 7/005 |
| WO | WO 2005/040926 | | | 5/2005 | |

* cited by examiner

KINEMATIC MOUNT HAVING THREE POINTS OF CONTACT

CROSS REFERENCE TO RELATED APPLICATION

This application is a Continuation Application of PCT Application No. PCT/IL2023/050528 filed on May 23, 2023, which claims priority from Israeli Patent Application No. 293278 filed on May 23, 2022, which is incorporated herein by reference in its entirety.

FIELD OF THE INVENTION

The present invention relates to a kinematic mount, and more particularly, the present invention relates to a kinematic mount having three points of contact.

BACKGROUND OF THE INVENTION

Statically mounting a rigid body onto a frame (e.g., of a satellite) via a mount may lead to two types of displacements affecting the contact points between the rigid body and the frame. The first type of displacement is the one due to inaccuracy in production or assembly forces. For example, if the harness contains a screw and the hole and one of the screws has been slightly displaced during assembly, then the screw-hole connection would apply a force onto both the screw and the other harness screws.

Another type of displacement is developed over time post assembly due to changes in the environmental conditions, for example change of temperature and/or pressure that may cause deformation of the rigid body or the frame. Both types of displacements may be applied to the connection between the rigid body and the frame are undesirable as they may inevitably lead to the stress in the material and damage the overall strength of the structure. It is therefore desirable to suggest a solution that would address both types of displacement.

A kinematic mount is a mechanical arrangement capable of harnessing one rigid body relative to another rigid body with very high repeatability, without introducing stresses and instability. The kinematic mount accomplishes this by using an exact number of contacts needed to allow the desired degrees of freedom.

A rigid body has six degrees of freedom (DOF). In a Cartesian coordinate system, the 6 DOF include three translations along the orthogonal axes and three rotations about the orthogonal axes. Providing a contact point between two rigid bodies eliminates one of the relative degrees of freedom between them.

In recent years, the use of satellites with large payloads, such as electro optical satellites, has become very popular. In an electro optical satellite, for instance, the camera or telescope is the main element (e.g., other than the engine and guidance systems), both functionally and in terms of volume and weight.

During operation of such satellites, a successful payload (e.g., telescope) harnessing can be a significant challenge affecting the overall system performance, for instance to receive a clear and accurate image. The satellite must endure the accelerations of the satellite launch and maintain good performance in the environmental conditions of the orbit, including lack of gravity and/or pressure, and frequent changes in ambient conditions such as temperature.

Mounting a payload upon a movable platform (e.g., mounting of a telescope upon a satellite) is a kinematic task.

Theoretically, one should harness 6 DOF to restrain displacement. Previous mounting solutions for telescopes in satellites usually include three pairs of flexures (or legs) to mount the telescope in 6 DOF but were influenced by the rigid nature of the legs such that real kinematic harnessing was not possible.

However, the connecting elements that are typically used are six single flexures, or three pairs. The elastics of such flexures can provide the harness, but the directions in which they are supposed to be loose are not sufficiently or effectively loose. Moreover, the stiffness of a flexible leaf is not zero, so in fact the mounting with flexures might add in unnecessary stresses.

The desired situation is one in which the harness holds the payload at exactly 6 DOF, where each pair of flexures can hold in the axial and tangential direction, and in total in all the desired directions. However, with the currently available solutions, there are displacements applied at the radial direction as well, which further need addressing.

SUMMARY OF THE INVENTION

Embodiments of the present invention provide a mount surrounding a rigid body within an enclosure which addresses the two aforementioned types of undesirable displacements which may develop when harnessing a rigid body onto a mount of another platform. The mount may include: a first pair of a first pin and first spherical bearing, wherein the first pin is movable within the first spherical bearing while being in contact with the rigid body such that two degrees of freedom restriction are provided to the displacement of the rigid body; a second pair of a second pin and second spherical bearing, wherein the second pin is movable within the second spherical bearing while being in contact with the rigid body such that two degrees of freedom restriction are provided to the displacement of the rigid body; and a third pair of a third pin and third spherical bearing, wherein the third pin is movable within the third spherical bearing while being in contact with the rigid body such that two degrees of freedom restriction are provided to the displacement of the rigid body, wherein at least one of the first spherical bearing, the second spherical bearing, and the third spherical bearing is configured to be in contact with the enclosure.

BRIEF DESCRIPTION OF THE DRAWINGS

The subject matter regarded as the invention is particularly pointed out and distinctly claimed in the concluding portion of the specification. The invention, however, both as to organization and method of operation, together with rigid bodies, features, and advantages thereof, may best be understood by reference to the following detailed description when read with the accompanying drawings in which:

Figure 1:
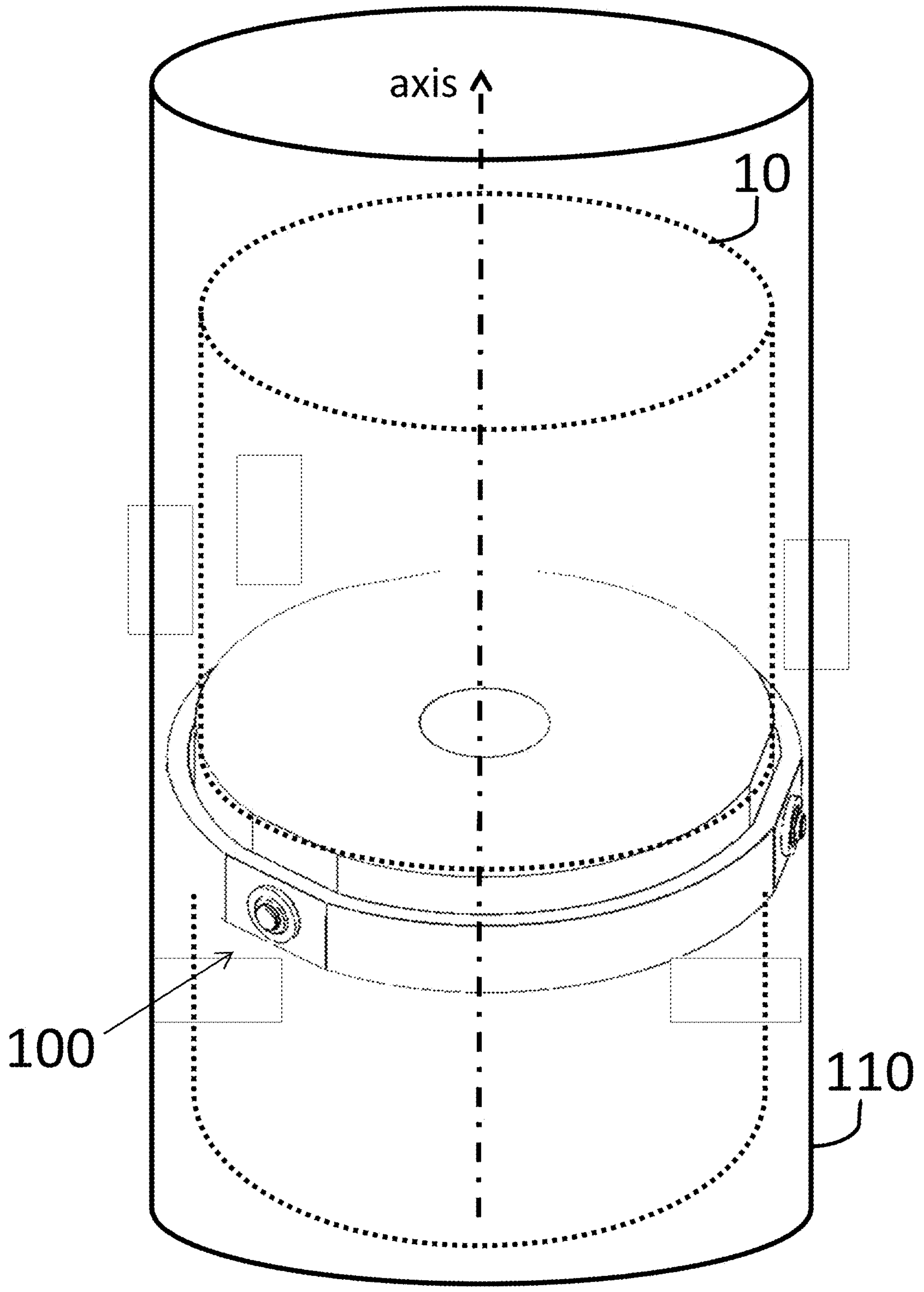
FIG. 1 is a perspective view illustrating a mount surrounding a rigid body within an enclosure, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

According to some embodiments, apparatuses, systems and methods are provided for a kinematic mount to harness a rigid body within an enclosure. For example, stably hold or harness a payload such as, but not limited to, a telescope within a platform, such as, but not limited to, a satellite. Harnessing is such that even minimal changes in heat, pressure and the like have a minimal effect on the operation of the payload.

Reference is made to FIG. 1, which illustrates a mount 100 surrounding a rigid body 10 within an enclosure 110, according to some embodiments of the invention.

Mount 100 may be configured to surround the rigid body 10, such as an imager or a telescope, in order to harness the rigid body 10 within enclosure 110 (e.g., a satellite). In some embodiments, mount 100 may harness the rigid body 10 in a variety of enclosures other than satellites, so as to harness the rigid body 10 during changes in temperature and/or pressure. For example, a constraint may cause the mount 100, or at least a portion of the mount 100, to move such that the rigid body 10 is restrained during changes in temperature and/or pressure.

In some embodiments, at least two mounts 100 may be used to harness the rigid body 10 within enclosure 110. For example, each mount 100 may harness the rigid body 10 at a different location (e.g., for rigid bodies 10 having a complex structure).

According to some embodiments, the mount 100 includes a plurality of dedicated bearings such that the mount 100 may, using three points of contact, enable 6 DOF where each point of contact restricts 4 of the DOF and allows 2 DOF so in total the 6 DOF are enabled.

In some embodiments, the shape of mount 100 may correspond to the shape of the rigid body 10. For example, a cylindrical shaped telescope 10 may be harnessed by a cylindrical shaped mount 100. The rigid body can be of any shape such as spheric, and the enclosure can also be of any shape such as cubical and the like.

Figure 2A:
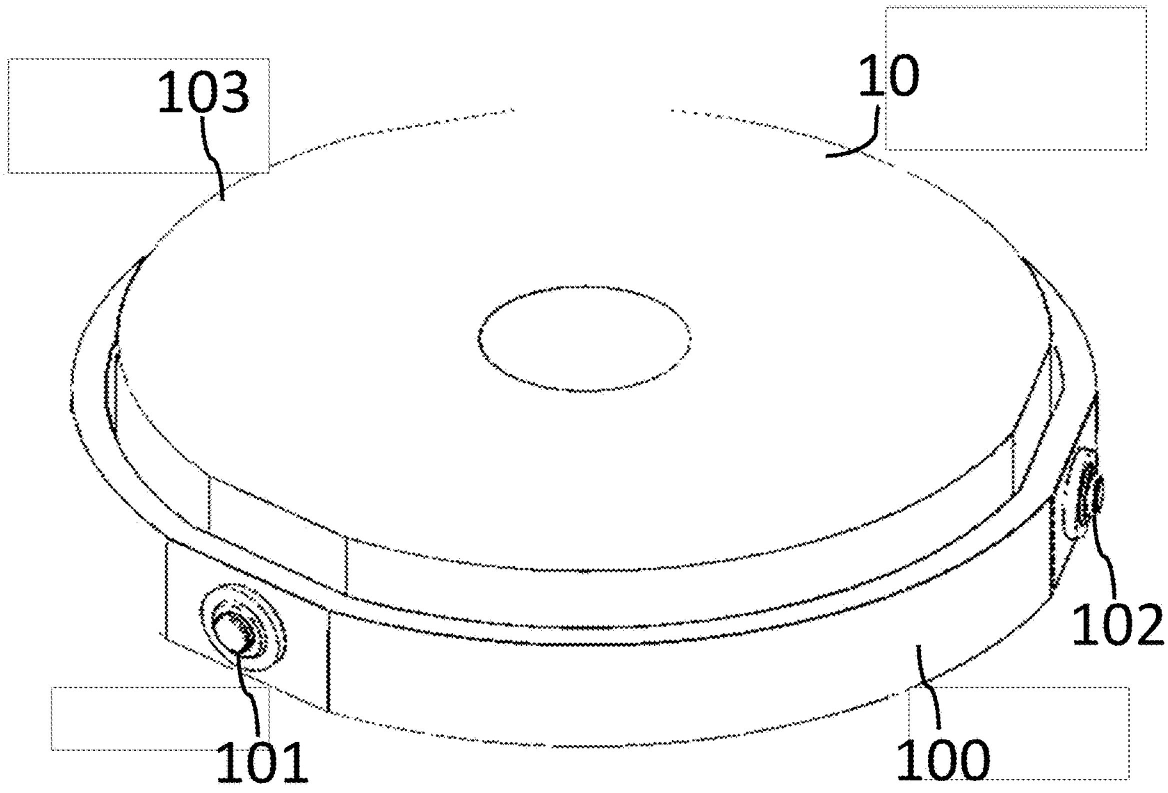
FIG. 2A is a perspective view illustrating the mount surrounding the rigid body, according to some embodiments of the invention.

Reference is made to FIG. 2A, which illustrates the mount 100 surrounding the rigid body 10, according to some embodiments of the invention.

Mount 100 may include three dedicated bearings to harness the rigid body 10 and accordingly restrict displacement of the rigid body 10 for six degrees of freedom. In some embodiments, each bearing may restrict the displacement of rigid body 10 for two degrees of freedom.

According to some embodiments, mount 100 may include three pairs 101, 102, 103 of pin and spherical bearings to hold the rigid body 10. Accordingly, each pair 101, 102, 103 may restrict two degrees of freedom (with freedom in other four degrees of freedom).

In some embodiments, displacement of the rigid body 10 (e.g., due to changes in temperature and/or pressure) may not cause counter displacement by the mount 100 due to the harnessing. For example, a displacement on the rigid body 10, e.g., due to changes in temperature and/or pressure, may cause a displacement of at least one pin and/or spherical bearing such that the rigid body 10 is restrained while the mount 100 is not moving.

Figure 2B:
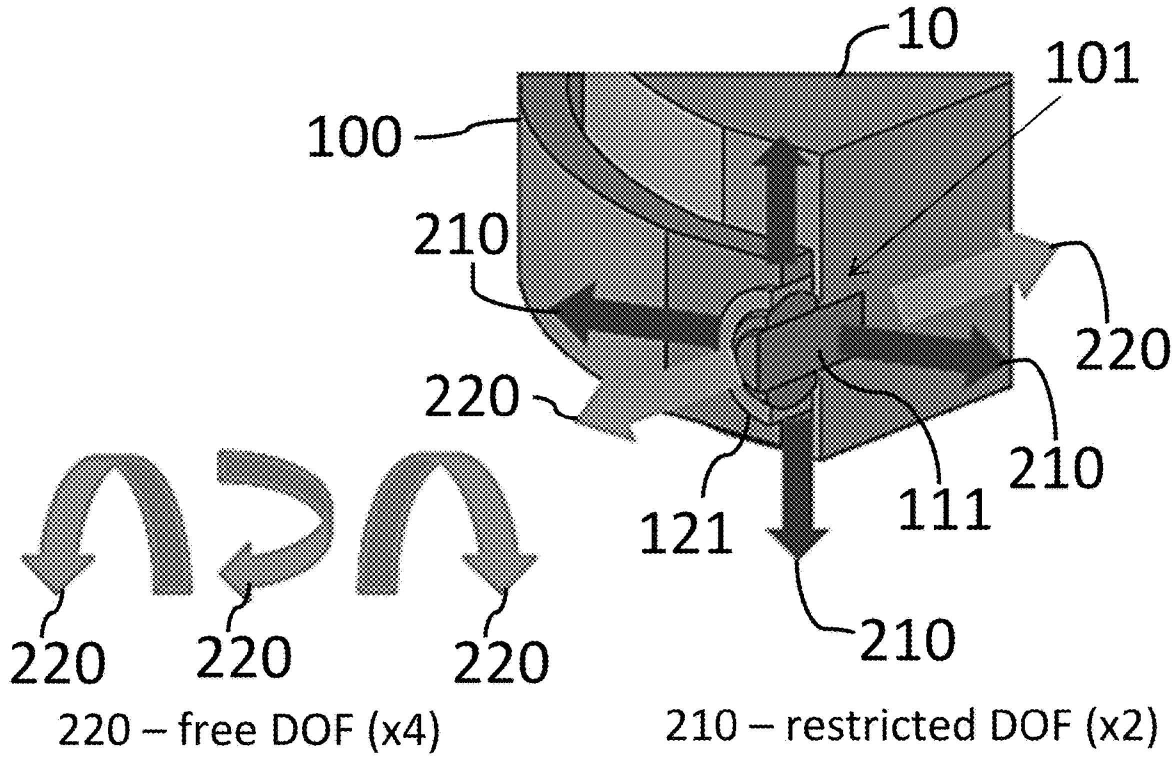
FIG. 2B is a cross-sectional perspective view illustrating a pair of a pin and spherical bearing of the mount, according to some embodiments of the invention.

Reference is made to FIG. 2B, which illustrates a cross-sectional view of a pair 101 of pin 111 and spherical bearing 121 of mount 100, according to some embodiments of the invention.

Each displacement of the rigid body 10 (e.g., due to change in heat, pressure or acceleration) may be enabled by the displacement of pin 111 within the spherical bearings 121, and/or respectively by other pairs of pins and spherical bearings. In some embodiments, the mount 100 may not move while a displacement is applied to rigid body 10, while the pairs 101, 102, 103 of pin and spherical bearings restrict the displacement of the rigid body 10.

The arrows indicated 210 represent a displacement with restricted displacement, for instance due to change in pressure (e.g., during launch of a satellite). Accordingly, the pin and spherical bearings pair 101 may restrict displacement along the arrows indicated 210, thereby restricting displacement in two degrees of freedom. In some embodiments, this displacement may be countered by displacement of the other pins and spherical bearing at mount 100, as further described hereinafter.

Figure 3A:
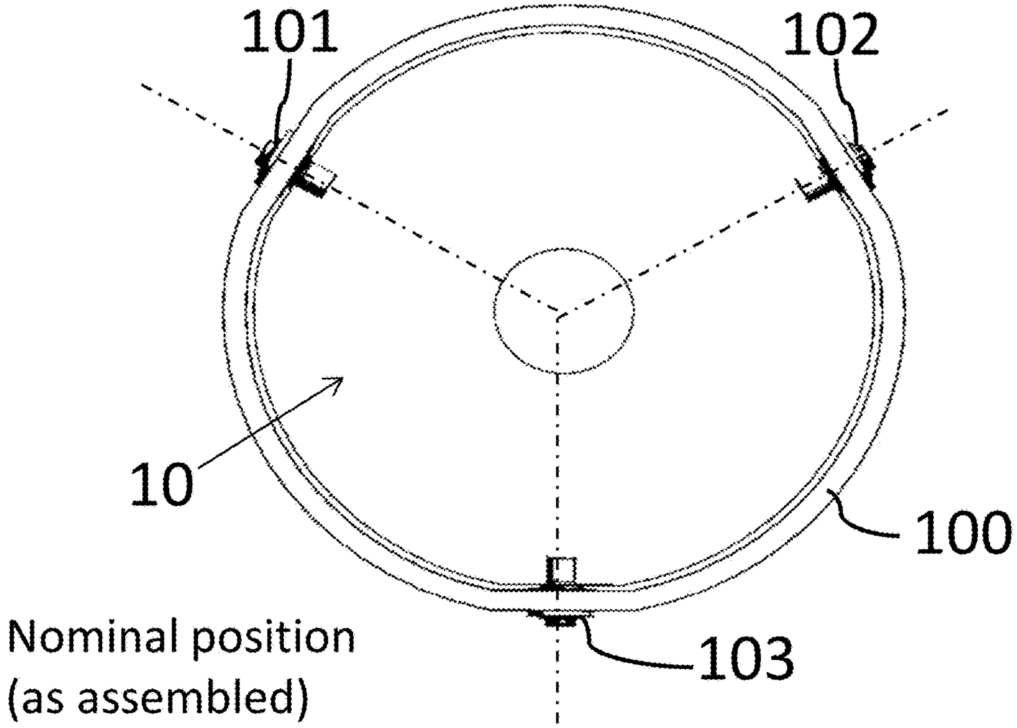
FIG. 3A is a top/bottom view of the mount, at a nominal position, according to some embodiments of the invention.
Figure 3B:
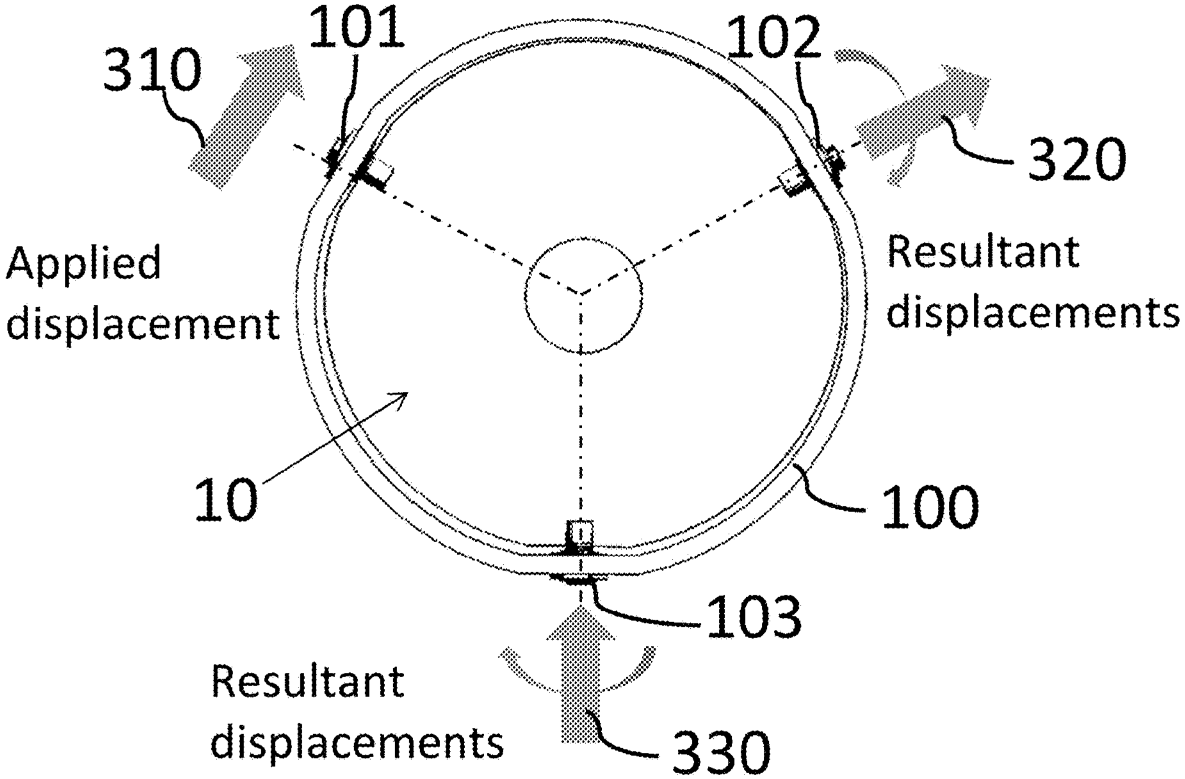
FIG. 3B is a top/bottom view of the mount, with applied displacements, according to some embodiments of the invention.

In some embodiments, pin 111 may move along the arrows indicated 220. For example, pin 111 may move along the axis that is radial to the rigid body 10 (e.g., as shown in FIGS. 3A-3B), as well as move along three spherical directions indicated 220 due to the spherical bearing 121.

While a single pair 101 of pin 111 and spherical bearing 121 of the mount 100 is shown in FIG. 2B, the same structure may apply to other pairs 102, 103 of the mount 100.

Referring back to FIG. 2A. In some embodiments, the mount 100 may include a first pair 101 of a first pin 111 and first spherical bearing 121, where the first pin 111 is movable within the first spherical bearing 121 while being in contact with the rigid body 10 such that two degrees of freedom restriction are provided to the displacement of the rigid body 10 (as indicated by arrows 210).

In some embodiments, the mount 100 may include a second pair 102 of a second pin 112 and second spherical bearing 122, wherein the second pin 112 is movable within the second spherical bearing 122 while being in contact with the rigid body 10 such that two degrees of freedom restriction are provided to the displacement of the rigid body 10.

In some embodiments, the mount 100 may include a third pair 103 of a third pin 113 and third spherical bearing 123, where the third pin 113 is movable within the third spherical bearing 123 while being in contact with the rigid body 10 such that two degrees of freedom restriction are provided to the displacement of the rigid body 10. In some embodiments, the first pin 111, the second pin 112 and the third pin 113 are simultaneously in contact with the rigid body 10.

In some embodiments, at least one of: the first pin 111, the second pin 112, and the third pin 113, is configured to move in a radial direction corresponding to mount 100, or to the center of the mount 100.

In some embodiments, at least one of: the first pin 111, the second pin 112, and the third pin 113, includes a compressional resilience in the range of 60-70 Rc. In some embodiments, at least one of: the first pair 101, the second pair 102, and the third pair 103, includes a tolerance lower or equal to 10 micrometers.

Accordingly, using three pairs of a pin and spherical bearing may allow harnessing rigid bodies in six degrees of freedom with the mount 100, with each pair restricting displacement in two degrees of freedom, and providing a freedom of movement in the other four degrees of freedom. Thus, the mount 100 may have low volume, low weight and low costs compared to other solutions.

Another advantage of mount 100 is that there is no need for high precision during the harnessing process (e.g., in contrast to other solutions), since the pins and/or spherical bearings adapt themselves to the existing geometry. Specifically, embodiments of the present invention provide high precision in mounting the telescope, whereas during harnessing there is no need for high precision.

Reference is made to FIG. 3A, which illustrates a top view of mount 100, according to some embodiments of the invention.

In some embodiments, the first pair 101, the second pair 102 and the third pair 103 are at equal distances from each other on the mount 100. For example, having equal radial distance on a ring-shaped mount. Having equal radial distances is not necessary and the pairs can be located at un-even radial distances as long as at least one of the pins is not parallel to the other two pins.

In some embodiments, the longitudinal axes (passing through the rigid body 10 and indicated by dashed lines) of the first pin 101, the second pin 102, and the third pin 103 should not be parallel to each other.

In some embodiments, at least one of the first spherical bearing 121, the second spherical bearing 122, and the third spherical bearing 123 is configured to be (at least partially) in contact with the enclosure 110 as shown in FIG. 1.

Reference is made to FIG. 3B, which illustrates a top view of mount 100, according to some embodiments of the invention. In some embodiments, at least one of: the first spherical bearing 121, the second spherical bearing 122, and the third spherical bearing 123 enables displacement of the corresponding pin within that spherical bearing in at least one non-restricted spherical direction. For example, the pin may be moved in spherical or tangential directions due to displacement of the spherical bearing within mount 100.

In some embodiments, restriction in displacement on at least one of: the first pair 101, the second pair 102, and the third pair 103, causes a counter displacement by the remaining pairs.

In case that a constraint indicated with arrow 310 occurs (e.g., due to change in ambient pressure) at the first pair 101, the rigid body 10 may be moved within mount 100. For instance, the displacement indicated with arrow 310 may be a movement applied onto the first pair 101 such that the first pair 101 may be forced to move in the direction of the arrow 310 and away from the dashed symmetry line (e.g., because of small deformation of mount 100). However, since the first pair 101 physically moved in the direction of the arrow 310, with the mount 100, the remaining pairs may move accordingly to ensure that the rigid body 10 is still restrained with no forces or loads as a result. In other words, the resultant state after applying the displacement in direction 310 is also in equilibrium in terms of mechanical forces. For example, the second pair 102 may move in directions of the arrows indicated 320 and/or the third pair 103 may move in the direction of the arrows indicated 330, with radial displacement of the pins and spherical displacement of the bearings.

In some embodiments, the rigid body 10 may be moved within the mount 100 as a result of counter displacement by the second pair 102 along the arrow indicated 320 and/or the third pair 103 along the arrow indicated 330 including displacement by the first pin, second pin, first spherical bearing 121, and the second spherical bearing 122.

Figure 3C:
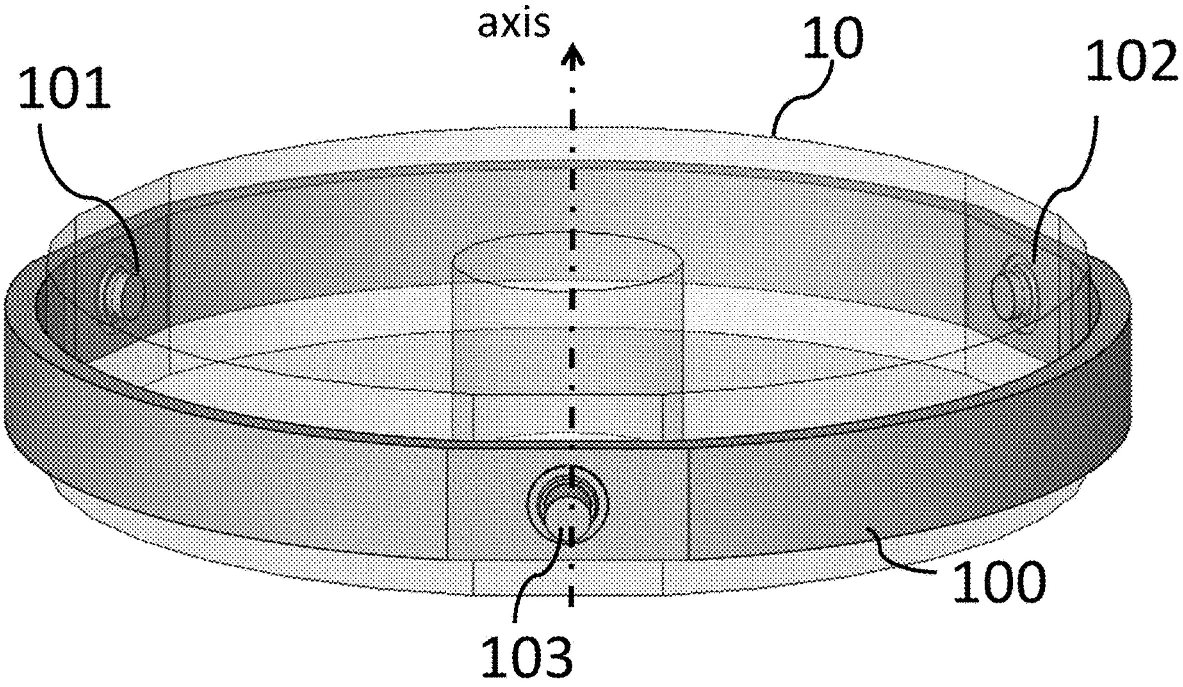
FIG. 3C is a perspective view of the mount, at a nominal position, according to some embodiments of the invention.
Figure 3D:
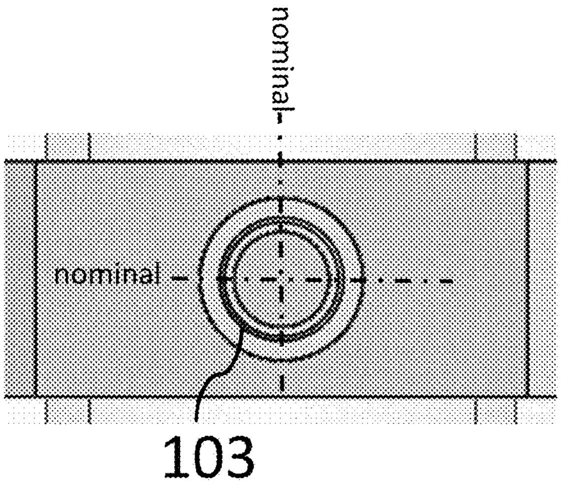
FIG. 3D shows one of the contact points of the mount, at a nominal position, according to some embodiments of the invention.

FIG. 3C is a perspective view of mount 100, harnessing rigid body 10 at a nominal position, according to some embodiments of the invention. FIG. 3D shows one of the contact points (third pair 103) of the mount 100, at a nominal position.

Figure 3E:
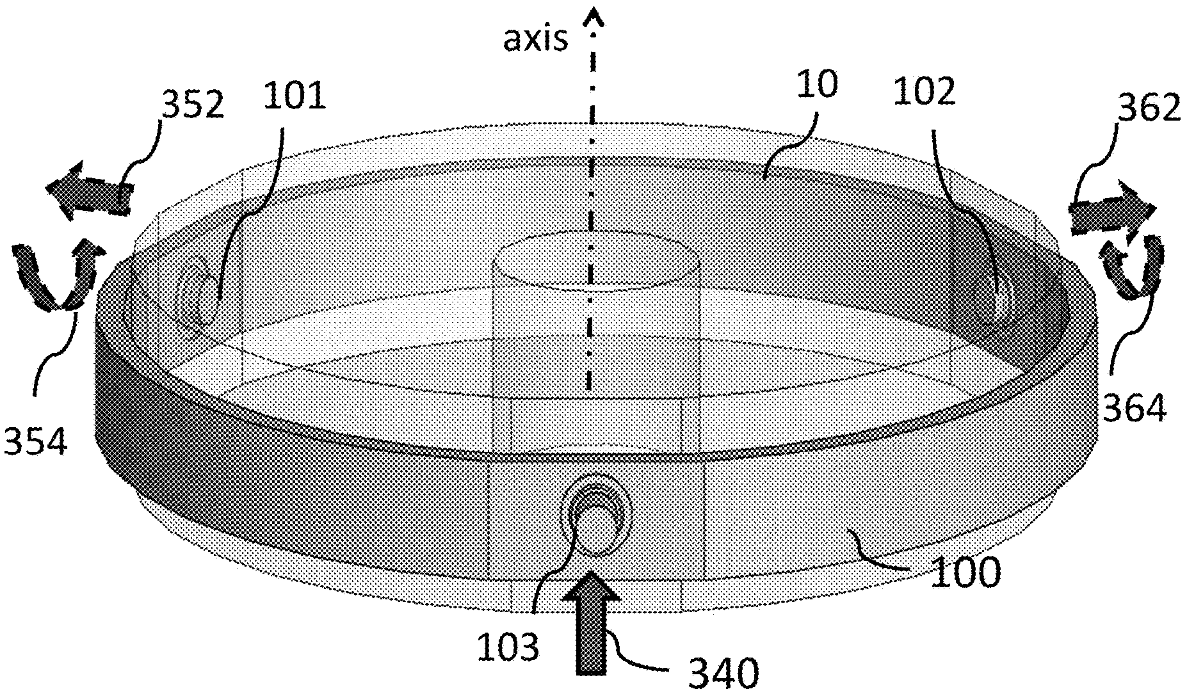
FIG. 3E is a perspective view of the mount, at a displaced position along axial direction, according to some embodiments of the invention.
Figure 3F:
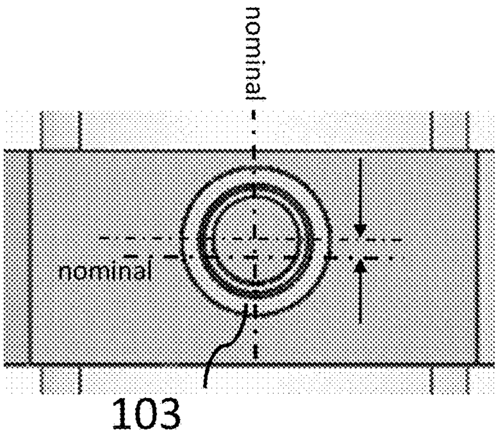
FIG. 3F shows one of the contact points of the mount at a displaced position along axial direction, according to some embodiments of the invention.

FIG. 3E is a perspective view of mount 100, harnessing rigid body 10 at a displaced position along an axial direction (indicated in the figure as 'axis'), according to some embodiments of the invention. FIG. 3F shows one of the contact points (third pair 103) of mount 100, at a displaced position along an axial direction. When an axial displacement 340 in the axial direction is applied, for example due to change in ambient temperature (e.g. causing deformation of the mount 100), the third pair 103 physically moved in the direction of the arrow 340, together with the mount 100, and therefore, the remaining pairs namely first pair 101 and second pair 102 move along radial directions 352 and 362 respectively and further rotate around their axes in rotational direction 354 and 364 respectively so as to ensure that the rigid body 10 is still restrained.

Figure 3G:
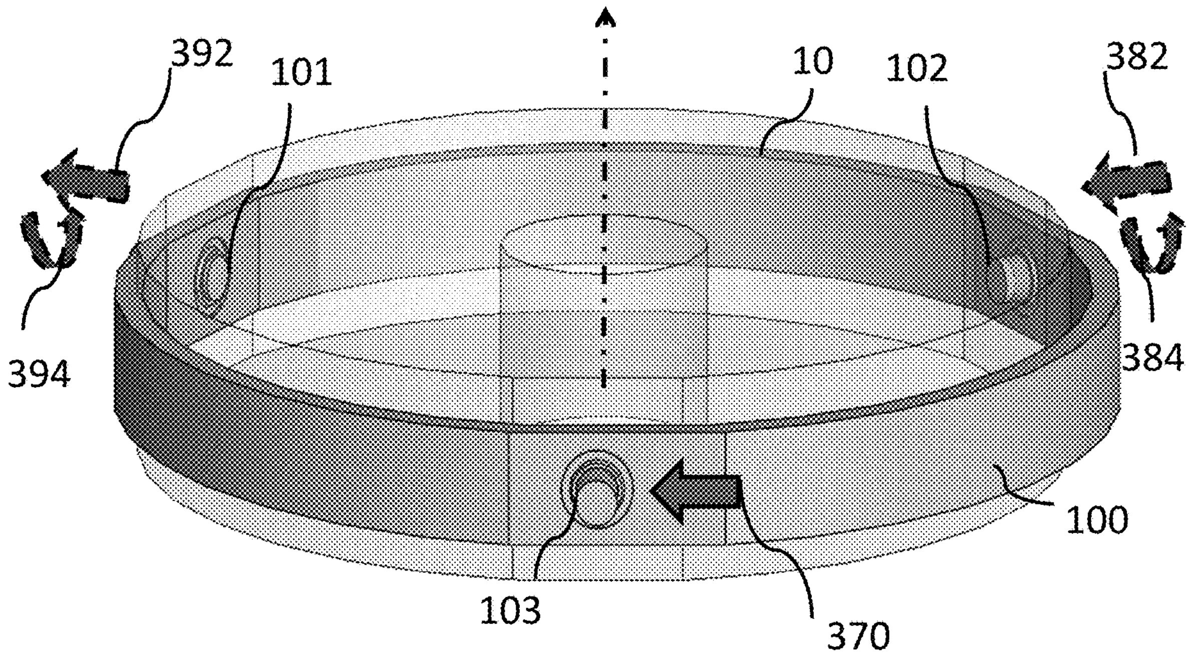
FIG. 3G is a perspective view of the mount, at a displaced position along tangential direction, according to some embodiments of the invention.
Figure 3H:
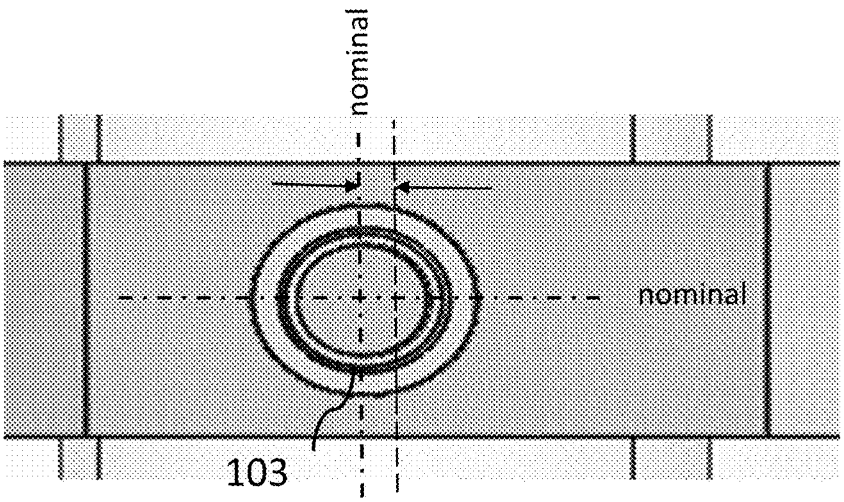
FIG. 3H shows one of the contact points of the mount at a displaced position along tangential direction, according to some embodiments of the invention.

FIG. 3G is a perspective view of mount 100, harnessing rigid body 10 at a displaced position along a tangential direction, according to some embodiments of the invention. FIG. 3H shows one of the contact points (third pair 103) of mount 100, at a displaced position along a tangential direction. When a tangential displacement 370 is applied, for example due to change in ambient temperature (e.g. causing deformation of the mount 100), the third pair 103 physically moves in the direction of the arrow 370, together with the mount 100, and therefore remaining pairs namely first pair 101 and second pair 102 moves along radial directions 392 and 382 respectively and further rotate around their axes in rotational direction 384 and 394 respectively so as to ensure that the rigid body 10 is still restrained.

Figure 4A:
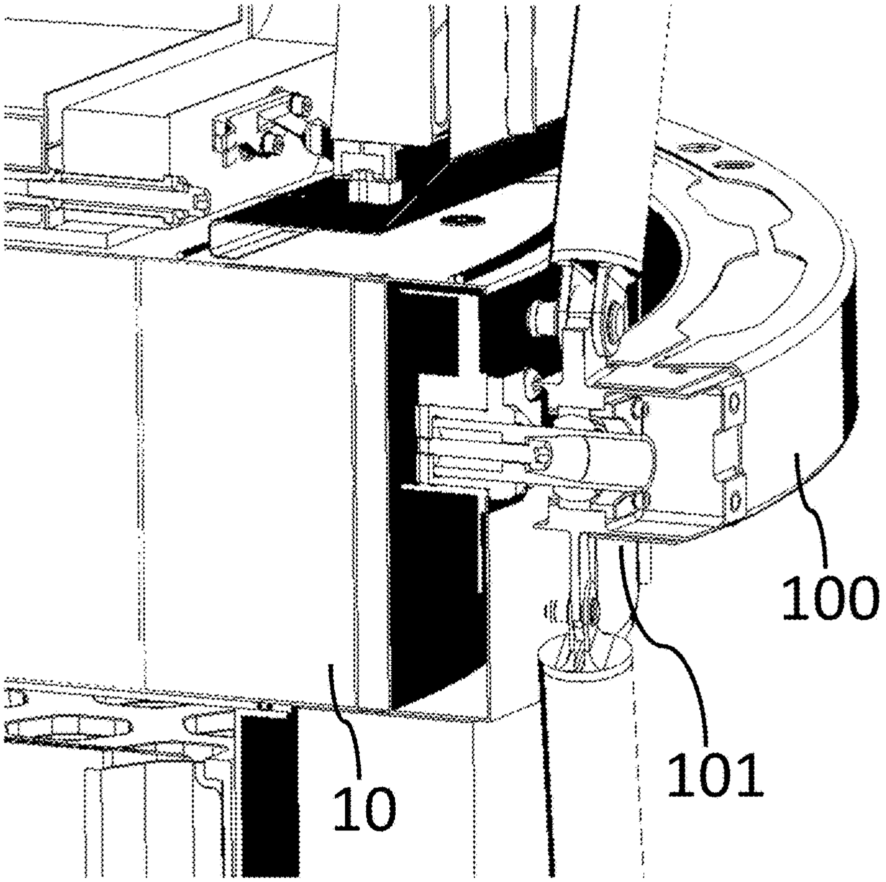
FIG. 4A a side cross-sectional view of an exemplary mount surrounding a rigid body, according to some embodiments of the invention.
Figure 4B:
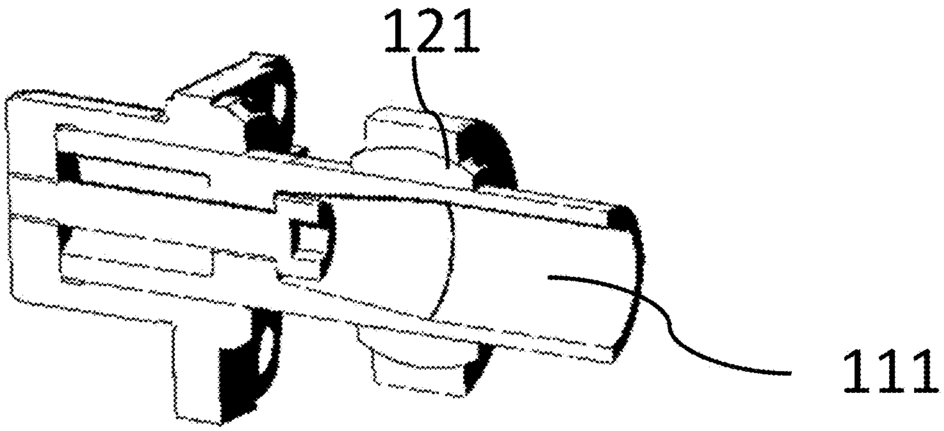
FIG. 4B illustrates a side cross-sectional view of an example pair of pin and spherical bearing, according to some embodiments of the invention.

Reference is made to FIGS. 4A and 4B, which illustrate a side cross-sectional view of an example mount 100 surrounding a rigid body 10, and of an example pair 101 of pin 111 and spherical bearing 121, respectively, according to some embodiments of the invention.

In some embodiments, mount 100 may be held in place by at least one pair of flexures 401, 402. The flexures may be attached to a pair of pins and spherical bearing, such that the flexures may be configured to allow spherical displacement of the pin within the spherical bearing.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A mount surrounding a rigid body within an enclosure, the mount comprising:

exactly three pairs of a pin and spherical bearing harnessing said rigid body in six degrees of freedom, wherein each one of the three pairs restricts a displacement of the rigid body in two degrees of freedom, and provides a freedom of movement in the other four degrees of freedom, said exactly three pairs comprising:

a first pair comprising a first pin and first spherical bearing, wherein the first pin is movable within the first spherical bearing while being in direct contact with the rigid body such that two degrees of freedom restriction are provided to the displacement of the rigid body;

a second pair comprising a second pin and second spherical bearing, wherein the second pin is movable within the second spherical bearing while being in direct contact with the rigid body such that two degrees of freedom restriction are provided to the displacement of the rigid body; and a third pair comprising a third pin and third spherical bearing, wherein the third pin is movable within the third spherical bearing while being in direct contact with the rigid body such that two degrees of freedom restriction are provided to the displacement of the rigid body, wherein the first spherical bearing, the second spherical bearing, and the third spherical bearing are fixed to the mount, wherein the mount surrounding the rigid body is a separated element from the enclosure and from the rigid body and is located between the enclosure and the rigid body, and wherein at least one of: the pins and the at least one of the spherical bearings have a compressional resilience selected to withstand pressure and/or acceleration external to the enclosure.

2. The mount of claim 1, wherein restriction in displacement on at least one of: the first pair, the second pair, and the third pair, causes a counter displacement by the remaining pairs.

3. The mount of claim 1, wherein the shape of the mount and the shape of the rigid body have three mutual connection points with the three pairs.

4. The mount of claim 1, wherein the longitudinal axes of the first pin, the second pin, and the third pin are not parallel to each other.

5. The mount of claim 1, wherein the first pair, the second pair and the third pair are at equal or un-even distances from each other on the mount.

6. The mount of claim 1, wherein at least one of: the first pin, the second pin, and the third pin, is configured to move in a radial direction corresponding to the mount.

7. The mount of claim 1, wherein the first spherical bearing, the second spherical bearing, and the third spherical bearing are in contact with the enclosure.

8. The mount of claim 1, wherein at least one of: the first spherical bearing, the second spherical bearing, and the third spherical bearing enables displacement of the corresponding pin in at least one non-restricted directions.

9. The mount of claim 1, wherein at least one of: the first pin, the second pin, and the third pin, comprises hardness in the range of 60-70 Rc.

10. The mount of claim 1, wherein at least one of: the first pair, the second pair, and the third pair, comprises a small tolerance lower or equal to 10 micrometers.

11. A method of stabilizing a rigid body within an enclosure, the method comprising:

surrounding the rigid body with a mount within the enclosure, wherein the mount comprises:

exactly three pairs of a pin and spherical bearing harnessing said rigid body in six degrees of freedom, wherein each one of the three pairs restricts a displacement of the rigid body in two degrees of freedom, and provides a freedom of movement in the other four degrees of freedom, said exactly three pairs comprising:

a first pair comprising a first pin and first spherical bearing, wherein the first pin is movable within the first spherical bearing while being in rigid contact with the rigid body such that two degrees of freedom restriction are provided to the displacement of the rigid body;

a second pair comprising a second pin and second spherical bearing, wherein the second pin is movable within the second spherical bearing while being in direct contact with the rigid body such that two degrees of freedom restriction are provided to the displacement of the rigid body; and a third pair comprising a third pin and third spherical bearing, wherein the third pin is movable within the third spherical bearing while being in rigid contact with the rigid body such that two degrees of freedom restriction are provided to the displacement of the rigid body; and moving at least one of: the first pair, the second pair, and the third pair, in response to restriction in displacement on the remaining pair, wherein the first spherical bearing, the second spherical bearing, and the third spherical bearing are fixed to the mount, wherein the mount surrounding the rigid body is a separated element from the enclosure and from the rigid body and is located between the enclosure and the rigid body, and wherein at least one of: the pins and the at least one of the spherical bearings have a compressional resilience selected to withstand pressure and/or acceleration external to the enclosure.

12. The method of claim 11, wherein at least one of the first spherical bearing, the second spherical bearing, and the third spherical bearing is configured to be in contact with the enclosure.

13. The method of claim 11, wherein restriction in displacement on at least one of: the first pair, the second pair, and the third pair, causes a counter displacement by the remaining pairs.

14. The method of claim 11, wherein the shape of the mount and the shape of the rigid body have three mutual connection points with the three pairs.

15. The method of claim 11, wherein the longitudinal axes of the first pin, the second pin, and the third pin are not parallel to each other.

16. The method of claim 11, wherein the first pair, the second pair and the third pair are at equal or un-even distances from each other on the mount.

17. The method of claim 11, wherein at least one of: the first pin, the second pin, and the third pin, is configured to move in a radial direction corresponding to the mount.

18. The method of claim 11, wherein the first spherical bearing, the second spherical bearing, and the third spherical bearing are in contact with the enclosure.

19. The method of claim 11, wherein at least one of: the first spherical bearing, the second spherical bearing, and the third spherical bearing enables displacement of the corresponding pin in at least one non-restricted spherical direction.

20. The method of claim 11, wherein at least one of: the first pin, the second pin, and the third pin, comprises hardness in the range of 60-70 Rc.

* * * * *